United States Patent [19]

Clews

[11] Patent Number: 5,642,557
[45] Date of Patent: Jul. 1, 1997

[54] PANEL DISPLAY SYSTEM

[75] Inventor: Christopher Mark Clews, Green Bay, New Zealand

[73] Assignee: C J Distributors Limited, Auckland, New Zealand

[21] Appl. No.: 615,895

[22] Filed: Mar. 14, 1996

Related U.S. Application Data

[63] Continuation of Ser. No. 303,376, Sep. 9, 1994, abandoned.

[51] Int. Cl.⁶ ..................................................... A44B 21/00
[52] U.S. Cl. .................. 24/339; 52/285.3; 403/DIG. 10; 403/391; 248/74.1; 24/298
[58] Field of Search ............................... 24/339, 349, 343, 24/298, 292, 297, 457, 482, 530; 403/387, 391, 396, 397, DIG. 10; 256/24; 52/285.3; 312/111, 263, 265.3, 265.4, 265.5; 248/74.1

[56] References Cited

U.S. PATENT DOCUMENTS

| | | |
|---|---|---|
| 884,256 | 4/1908 | Addie . |
| 3,213,500 | 10/1965 | Thompson ................................. 24/73 |
| 3,521,332 | 7/1970 | Kramer ...................................... 24/81 |
| 3,528,559 | 9/1970 | Miller ........................................ 211/178 |
| 3,778,537 | 12/1973 | Miller ................... 174/138 R |
| 3,848,388 | 11/1974 | Bretche et al. ........................ 52/753 D |
| 4,002,349 | 1/1977 | Dopp ................................. 280/11.37 A |
| 4,407,472 | 10/1983 | Beck ...................................... 248/89 |
| 4,774,792 | 10/1988 | Ballance ................................. 52/282 |
| 4,821,382 | 4/1989 | Puschkarski ............................. 24/298 |
| 4,997,148 | 3/1991 | Sherman ................................ 248/74.1 |

FOREIGN PATENT DOCUMENTS

| | | |
|---|---|---|
| 217394 | 8/1986 | New Zealand . |
| 894867 | 4/1962 | United Kingdom ............... 248/74.2 |

*Primary Examiner*—Peter M. Cuomo
*Assistant Examiner*—Robert J. Sandy
*Attorney, Agent, or Firm*—Stetina Brunda & Buyan

[57] ABSTRACT

This invention relates to a clip for releasably connecting a panel edge to a rod. The clip comprises a first jaw for releasable connection to the panel edge, and an opposed, substantially arcuate, second jaw for releasable connection to the rod. The first jaw includes a locking means for engaging with a complimentary part of the panel edge. The first and second jaws are integrally formed of a resilient material. The clip may be particularly suitable for joining display panels together about a common connecting rod. The display panels, once connected or joined, are free to move with respect to each other about the common connecting rod which acts as a hinge.

8 Claims, 1 Drawing Sheet

PANEL DISPLAY SYSTEM

This application is a continuation of application Ser. No. 08/303,376, filed Sep. 9, 1994, now abandoned.

FIELD OF THE INVENTION

In particular, the invention relates to a clip for use in connecting or joining panels to a rod or pin. However, for convenience only the invention will predominantly be described as a clip for use in connecting display panels to a common connecting rod or pin for which the invention may be particularly suitable. However, it is to be understood that it is not to be limited as such.

BACKGROUND OF THE INVENTION

Panels such as display panels are often arranged into various free-standing configurations or shapes as required or desired. For example, a hexagonal arrangement of panels may be constructed by joining six or twelve panels in an appropriate fashion. Alternatively, a number of panels may be joined together in sequence to produce a wall or partition.

Display panels of this nature are usually provided with a finishing strip or border around their periphery, and this finishing strip is often styled to form part of the means/apparatus used for connecting the display panels together.

Methods/apparatus currently available for connecting display panels generally involve the use of cylindrical connecting rods or pins (hereinafter "rods") and rod-to-panel clips. One end of such rod-to-panel clips are usually adapted to fit into an appropriately formed channel cut into and along the edge or finishing strip of a panel, the other end being adapted to receive and retain a connecting rod. The connecting rod may then be joined to clips attached to other panels, thus connecting two or more display panels together.

One such rod-to-panel clip currently available is adapted to fit into and be slidable along an H-shaped channel cut into and along the finishing strip of a panel. Once positioned correctly, or as desired, the clip is screwed into place. The other end of the clip is adapted to receive and retain the connecting rod. However, disadvantages associated with such a clip and/or connecting method are that a screwdriver, at the very least, is required to fix the clips to the panels and the clips are not readily releasable from the panels. Because the clips are not readily releasable, the panels are usually transported with the clips in place and are therefore susceptible to being broken or snapped off. A further disadvantage is that some panels may be dented or otherwise deformed in transit by virtue of them being forced into or against clips attached to other panels. Also, the clips are fairly costly. An additional disadvantage is that the H-shaped channels cut into the finishing strips of panels detract from the aesthetic qualities of the same. A further disadvantage is that the edges of the panels and/or finishing strips must be fairly wide and/or thick to accommodate the internally-formed grooves, resulting in bulky panels and/or finishing strips.

Another similar system used for joining display panels also involves the use of clips which are adapted to fit into an appropriate or corresponding channel cut into and along the finishing strip of a panel. However, one end of such a clip is provided with a flange which is adapted to fit into the channel, and the other end is adapted to receive and retain a connecting rod. The arrangement is such that the action of pushing the connecting rod into the end of the clip adapted to receive and retain the same causes the outward spreading of the flange within the channel of the finishing strip of the panel, thereby securing the clip, and therefore the connecting rod, to the same. However, disadvantages associated with this clip/method are that the finishing strip of the panels are still required to have a channel cut therein or therealong and, again, this detracts from the overall aesthetic qualities of the finishing strips or panels. Also, the edges of the panels and/or finishing strips must be fairly wide or thick to accommodate the internally-formed channels, and this results in bulky panels and/or finishing strips. A further disadvantage is also that the cost of such clips may be prohibitive. Also, the joint between the clip and the finishing strip of the panel is not always firm or secure.

It is an object of the present invention to address the foregoing problems or at least to provide the public with a useful choice.

Further aspects and advantages of the present invention will become apparent from the ensuing description which is given by way of example only.

SUMMARY OF THE INVENTION

According to one aspect of the present invention there is provided a clip for releasably connecting a panel edge to a rod, said clip comprising a first jaw for releasable connection to the panel edge and an opposed, substantially arcuate, second jaw for releasable connection to the rod, said first jaw including locking means for engaging with a complementary part of the panel edge.

According to another aspect of the present invention there is provided a clip for releasably connecting a panel edge to a rod, substantially as described above, wherein said second jaw is greater than a semicircle in cross-section.

According to another aspect of the present invention there is provided a clip for releasably connecting a panel edge to a rod, substantially as described above, wherein the first and second jaws are integrally formed of a resilient material.

According to another aspect of the present invention there is provided a clip for releasably connecting a panel edge to a rod, substantially as described above, wherein the second jaw is undersized in relation to the diameter or cross-section of the rod, whereby the rod, once engaged and retained by the second jaw, urges the first jaw against the panel edge, thus increasing its grip on the panel edge.

According to another aspect of the present invention there is provided a clip for releasably connecting a panel edge to a rod, substantially as described above, wherein the first jaw-locking means engages side edges of the panel.

It is envisioned that the clip, which is the subject of the present invention, may be used for joining any type of panel to any type of rod. However, the clip may be particularly useful for connecting display panel boards to common connecting rods, thus enabling two or more display panels to be connected together in a desired arrangement or configuration, The clip may be provided with a first jaw for releasable connection with the panel edge of a panel, and an opposed, substantially arcuate, second jaw for releasable connection to the rod.

Preferably, the first jaw may be substantially U-shaped in cross-section to enable it to nestingly engage and/or be connected to the panel edge. The shape of the first jaw may, however, vary as required or desired, or as dictated by the shape, size, and/or configuration of the panel edge.

The first jaw may preferably be provided with locking means for engaging with a complementary part of the panel edge. Such locking means may preferably allow for the releasable engagement of the first jaw with the complementary part of the panel edge.

Preferably, the first jaw-locking means may engage the side edges of the panel.

Preferably, the first jaw may be provided with ribs fixed to opposite internal surfaces of the first jaw, the ribs being engageable with corresponding grooves disposed in and/or along the side edges of the panel edge. The internal ribs of the first jaw may therefore engage with the grooves disposed in and/or along the side edges of the panel edge, thereby releasably securing the first jaw and therefore the clip to the panel edge.

Alternatively, any other appropriate locking means, preferably a releasable locking means, may be utilized as required or as desired.

The second jaw may be of an appropriate shape and/or configuration to allow for releasable connection to the connecting rod. Because most connecting rods will be substantially circular in cross-section, the second jaw, in cross-section, may preferably be substantially arcuate.

Preferably, the second jaw may be greater than a semicircle in cross-section. This is so the rod may be able to be effectively retained by the second jaw.

Also preferably, the second jaw may be undersized in relation to the diameter or cross-section of the rod whereby the rod, once engaged and retained by the second jaw, urges the first jaw against the panel edge, thereby increasing the grip of the first jaw against or upon the panel edge, and hence securing the clip to the panel edge.

Additionally, the clip may be free to slide along the panel edge and/or side edges of the panel edge once the first jaw has been connected to the same. However, the design of the clip should allow for no significance movement of the clip along the panel edge during moderate pressure, once the rod has been engaged with the second jaw. In this way, it may be seen that the clip may be positioned at a desired or required point along the panel or panel edge before being secured in place by engaging and retaining the rod in the second jaw.

Further, the first and second jaws may be integrally formed of a resilient material. A plastic material may be preferred, and polyethylene may be particularly suitable.

Still further, the first and second jaws may be formed on opposite sides of a common connecting member or flexing member, whereby the first and second jaws are able to pivot or flex about the common connecting member with respect to each other and/or with respect to the common connecting member.

Still further, the common connecting member may be generally thinner in cross-section than the walls of the first and second jaws to enable the common connecting member to flex or pivot readily, or as appropriate.

Further, the common connecting member may be provided with weakening means whereby the first and second jaws may pivot and/or flex about the same without having to apply substantial force to the first and second jaws. For example, the weakening means may be provided by a groove cut into and extending along a longitudinal axis of the common connecting member. Any other suitable weakening means allowing for the ready flexing of the first and second jaws may alternatively be utilized as required or desired.

Further, the panel edge or side edges of the panel may be formed from an extruded section, preferably from an extruded metal or extruded plastic material.

It may be seen that the squeezing together of the second jaw urges the first jaw to flex outwardly by virtue of flexing or pivoting about the common connecting member and vice versa. In this manner, the first jaw of the clip may be connected to the panel edge by squeezing together the second jaw, which causes the first jaw to flex outwardly slightly, thus allowing or assisting the first jaw to pass over and clip onto the panel edge. This is useful if the fit between the panel edge and the first jaw is a substantially tight or snug fit. The first jaw may be of appropriate size, shape, or configuration to allow for a snug fit on or over the panel edge or side edges of the panel.

The clip should also allow for the snug and secure fitting and retention of the connecting rod to the clip, and therefore the panel edge. However, display panels joined together by the clip and rod should be free to pivot with respect to each other about the rod, which may act as a hinge. In this way, any angle between connected display panels may be arrived at as required or desired. Hence, the clip (and rod) allows for the ready assembling and disassembling of display panels into desired or required arrangements or configurations.

It may be seen that the first jaw of the clip engages and connects with outer surfaces of the panel edge, as compared to current panel-connecting clips which are generally attached to internal channels cut into and along the edges of the panel.

Because the first jaw of the clip preferably clips onto the side edges of the panel edge, the panel may be made thinner than a panel used with internally fitting clips currently available, since no additional thickness in the panel or finishing strip is required to accommodate an internal clipping mechanism, such as a channel. Hence, significant savings may be made in manufacturing panels using our clip since a lesser amount of material is required. Furthermore, the inner panels may be considered to be more aesthetically pleasing than thicker and bulkier panels.

Another advantage of our clip is that no tools, such as screwdrivers, hammers, or spanners, are required to fit the clip to a panel edge.

Further aspects of the present invention will become more apparent from the following description which is given by way of example only and with reference to the accompanying drawings.

DETAILED DESCRIPTION OF THE PREFERRED EMBODIMENT

Figure 1:
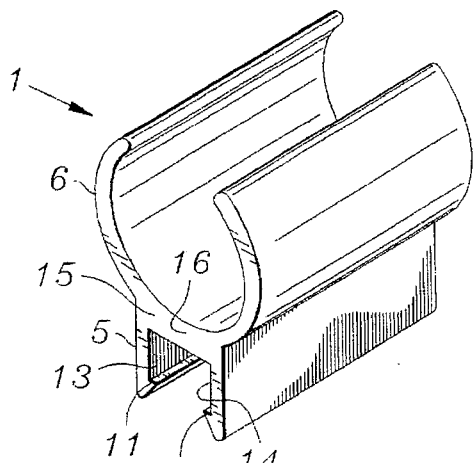
FIG. 1 is a perspective view of a clip, being one possible embodiment of the present invention.
Figure 1A:
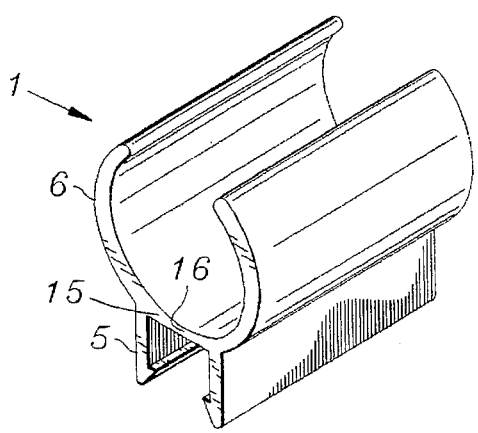
FIG. 1a is a perspective view of a clip having a thinner common connecting member.

Having reference to the drawings, there is shown a clip 1 for releasably connecting a panel edge 2 of a display panel 3 to a rod 4.

The clip 1 comprises a first jaw 5 for releasable connection to the panel edge 2, and an opposed, substantially arcuate, second jaw 6 for releasable connection to the rod 4.

The clip 1 is comprised of an extruded plastic material, namely polyethylene.

Figure 3:
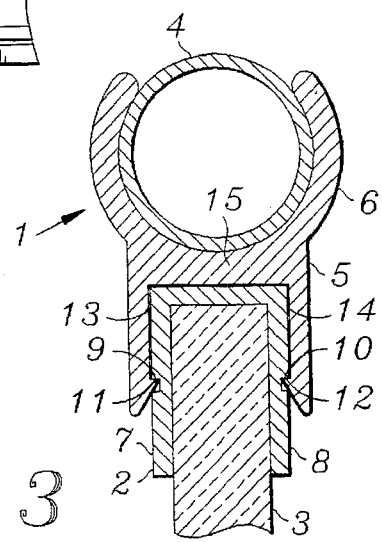
FIG. 3 is a cross-sectional diagram through A–A' of FIG. 2.

The second jaw 6 is greater than a semicircle in cross-section, as shown in FIGS. 1 and 3, to allow for the effective retention of the rod 4.

The panel edge 2 of the display panel 3 is formed from an extruded section, namely extruded aluminum. The side edges 7,8 of the panel edge 2 are provided with grooves 9,10 disposed therein or therealong.

The first jaw is provided with locking means for engaging with the grooves 9,10 of the side edges 7,8 of the panel edge 2. The locking means are in the form of ribs 11,12 which are fixed to opposite internal surfaces 13,14 of the first jaw 5. The ribs 11,12 are engageable with the grooves 9,10 to releasably connect the first jaw to the panel edge 2.

The first jaw is substantially U-shaped in cross-section, and is of an appropriate size to allow for a snug fit to the panel edge 2.

The width of the display panel 3 is 10 mm. The width of the panel edge extrusion 2 is 12 mm. The diameter of the rod 4 is 19 mm.

The second jaw 6 is undersized in relation to the diameter or cross-section of the rod 4 whereby the rod 4, once engaged and retained by the second jaw 6, urges the first jaw 5 against the side edges 7,8 of the panel edge 2, thereby increasing its grip on the panel edge 2. The clip 1 is therefore securely and snugly fitted to the panel edge 2 once the rod 4 has been engaged and retained by the second jaw 6.

The first and second jaws 5,6 are formed on opposite sides of a common connecting member 15. The first and second jaws 5,6 are able to pivot or flex with respect to each other and/or with respect to the common connecting member 15 about the common connecting member 15. The first and second jaws 5,6 generally pivot or flex about the common connecting member 15 at point 16. The common connecting member 15 is thinner in cross-section at point 16 than the walls of the first and second jaws 5,6.

The clip 1 is slidable along the panel edge 2 once the first jaw 5 has been connected to the same, and before the rod 4 has been engaged and retained by the second jaw 6.

Once the clip 1 has been positioned at an appropriate point along the panel edge 2, the rod 4 may be connected to and retained by the second jaw 6. Once retained by the second jaw 6 the clip 1 is no longer free to move along the panel edge 2 by virtue of the first jaw being urged against the side edges 7,8 of the panel edge 2 (as described above).

When fitting the first jaw 5 of the clip 1 to the panel edge 2, the second jaw 6 is flexed inwardly so that the first jaw 5 is urged outwardly to enable it to pass over and be connected to the panel edge 2. The ribs 11,12 retain the first jaw 5 of the clip 1 on the panel edge 2 until such time as the rod 4 is engaged and retained by the second jaw 6.

Any number of clips 1 may be used for connecting a connecting rod 4 to a panel edge 2 of a display panel 3.

Figure 2:
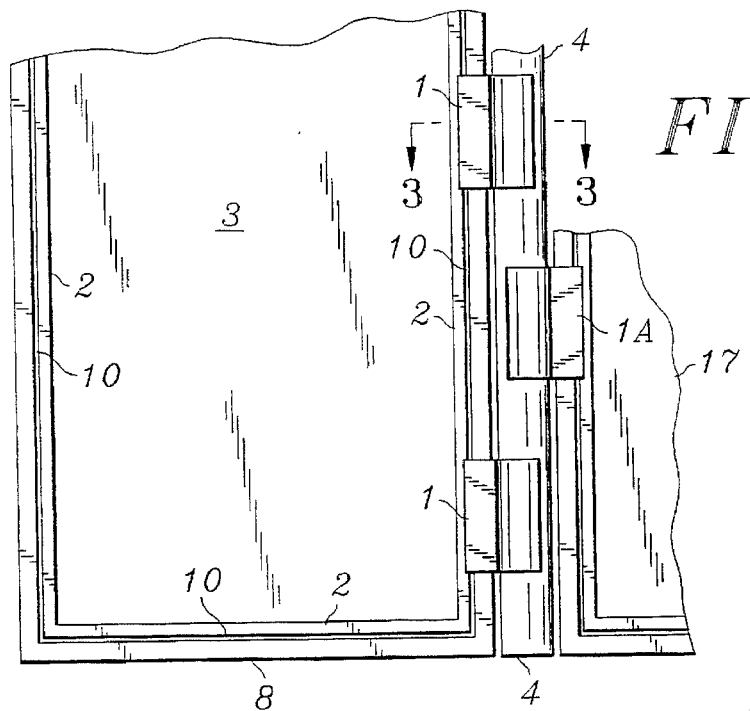
FIG. 2 is a front view of a display panel and connecting rod joined by clips of the same embodiment as that shown in FIG. 1.

With respect to FIG. 2, it can be seen that a second display panel 17 may be joined to the display panel 3 by use of at least one other clip 1a. Once fitted, the display panels 3,17 are effectively hinged with respect to each other since the connecting rod 4 acts as a hinge about which the panels 3,17 may be moved or swung. However, movement of the panels 3,17 in a longitudinal direction with respect to the rod 4 is effectively prevented.

Aspects of the present invention have been described by way of example only and it should be appreciated that modifications and additions may be made thereto without departing form the scope thereof, as described in the appended claims.

What is claimed is:

1. A panel display system for displaying a plurality of panels, said panel display system comprising:

a) at least one generally planar panel, each of said panels comprising a groove formed along at least one edge of the panel upon both sides thereof;

b) at least one rod;

c) a plurality of clips for attaching said panel(s) and rod(s) to one another, each of said clips comprising:

i) a first jaw for releasably attaching said clip to one of said panels, said jaw comprising ribs formed upon opposite internal surfaces thereof and configured to engage the grooves formed in said panels;

ii) a substantially arcuate second jaw for releasably attaching said clip to one of said rods, said second jaw formed integrally with said first jaw; and d) wherein two panels are thus interconnectable via attachment to a common one of said rods utilizing a plurality of said clips.

2. The panel display system as recited in claim 1, wherein said second jaw is greater than a semicircle in cross section.

3. The panel display system as recited in claim 1, wherein the first and second jaws are integrally formed of a resilient material.

4. The panel display system as recited in claim 1, wherein the second jaw is undersized in relation to the diameter of the rod, such that the rod, once engaged and retained by the second jaw, urges the first jaw against the panel edge, thus increasing its grip on the panel edge.

5. The panel display system as recited in claim 1, wherein said panel edge is formed from an extruded section.

6. The panel display system as recited in claim 1, wherein said clip is formed from extruded polyethylene.

7. The panel display system as recited in claim 1, wherein said first and second jaws are formed on opposite sides of a common connecting member, said first and second jaws being able to pivot or flex with respect to each other and said common connecting member about said common connecting member.

8. The panel display system as recited in claim 7, wherein said common connecting member is generally thinner in cross section than the first and second jaws.

* * * * *